(No Model.) 8 Sheets—Sheet 1.

J. F. SCHEUER.
CASH REGISTER AND RECORDER.

No. 569,674. Patented Oct. 20, 1896.

Witnesses:
Ferd. A. Otto.
E. L. Roesch

Inventor
Joseph F. Scheuer
By Erwin Wheeler & Wheeler
Attorneys.

(No Model.)  8 Sheets—Sheet 2.

J. F. SCHEUER.
CASH REGISTER AND RECORDER.

No. 569,674. Patented Oct. 20, 1896.

Witnesses:
Ferd. A. Otto
C. L. Avesch

Inventor
Joseph F. Scheuer
By Erwin Wheeler & Wheeler
Attorneys.

(No Model.)  8 Sheets—Sheet 4.

J. F. SCHEUER.
CASH REGISTER AND RECORDER.

No. 569,674.  Patented Oct. 20, 1896.

Fig. 11.

Witnesses.
Ferd. A. Otto.
C. L. Roesch.

Inventor
Joseph F. Scheuer
By Erwin Wheeler & J. Wheeler
Attorneys.

(No Model.) 8 Sheets—Sheet 5.
J. F. SCHEUER.
CASH REGISTER AND RECORDER.

No. 569,674. Patented Oct. 20, 1896.

Fig. 12.

Witnesses:
Ferd. A. Otto
C. L. Roesch

Inventor
Joseph F. Scheuer
By Erwin Wheeler & F. Wheeler
Attorneys.

(No Model.)  8 Sheets—Sheet 6.

J. F. SCHEUER.
CASH REGISTER AND RECORDER.

No. 569,674. Patented Oct. 20, 1896.

Witnesses:
Ferd A. Otto.
O. L. Roesch

Inventor
Joseph F. Scheuer
By Erwin Wheeler and Wheeler
Attorneys.

THE NORRIS PETERS CO., PHOTO-LITHO., WASHINGTON, D. C.

(No Model.)  8 Sheets—Sheet 7.

J. F. SCHEUER.
CASH REGISTER AND RECORDER.

No. 569,674. Patented Oct. 20, 1896.

Witnesses:
Ferd. A. Otto.
C. L. Roesch

Inventor
Joseph F. Scheuer
By Erwin Wheeler & J. Wheeler
Attorneys.

(No Model.) 8 Sheets—Sheet 8.
J. F. SCHEUER.
CASH REGISTER AND RECORDER.

No. 569,674. Patented Oct. 20, 1896.

Witnesses:
Ferd. A. Otto.
C. L. Roesch

Inventor
Joseph F. Scheuer
By Erwin Wheeler & Wheeler
Attorneys.

UNITED STATES PATENT OFFICE.

JOSEPH F. SCHEUER, OF MILWAUKEE, WISCONSIN.

CASH REGISTER AND RECORDER.

SPECIFICATION forming part of Letters Patent No. 569,674, dated October 20, 1896.

Application filed March 20, 1895. Serial No. 542,543. (No model.)

*To all whom it may concern:*

Be it known that I, JOSEPH F. SCHEUER, a citizen of the United States, residing at Milwaukee, in the county of Milwaukee and State of Wisconsin, have invented new and useful Improvements in Cash-Registers, of which the following is a specification.

My invention relates to improvements in cash-registers, and pertains especially, first, to the series of type-holding slides, provided with recording numerals or characters, in combination with the printing-plate and suitable actuating mechanism; second, to the printing-plate and the means for actuating the same, in combination with the ink-ribbons and bed-plate over which the record-strips are passed and the type-numerals adapted to be pressed thereon; third, to means for feeding the record-strips, discharging the coupon-strip, and storing the duplicate strip in combination with the printing mechanism; fourth, to the series of adding-wheels in combination with the registering-drums and the connecting mechanism of the type-slides; fifth, to the mechanism for opening the cash-drawer and sounding the gong, and, sixth, to the combination of the actuating push-bolt with the connecting mechanism of the several parts.

The object of my invention is to provide for recording in duplicate the amount or value of the individual sales, the identifying mark or number of the salesman, and for automatically registering the aggregate amounts of the sales, together with mechanism for opening the cash-box, sounding the gong, discharging the record-coupons, and storing the duplicate record-strip, in connection with a single actuating push-bolt manually operated from the exterior of the case.

In the following description reference is had to the accompanying drawings, in which—

Like parts are identified by the same reference-figures throughout the several views.

1 is the case or frame of my register.

2 is the cash-drawer; 3, the gong.

4 is the push-bolt for opening the drawer independently of the registering and recording apparatus.

5 is the recording push-bolt.

Figure 5:
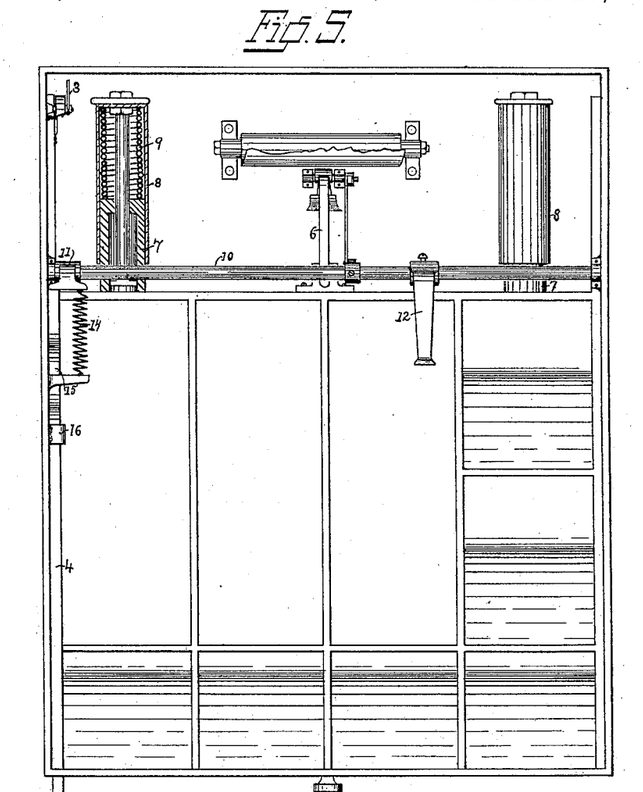
Fig. 5 is a plan view of the lower part of the case, drawn on the plane of the top of the cash-drawer.

The drawer is provided with a rearward-projecting locking-hook 6 and is closed against the spring-actuated plungers 7, located in tubular guides 8 in the rear of the case, as shown in Fig. 5. When the drawer is closed, the plungers are forced inward in the tubes, compressing the helical springs 9, and when the hook 6 is released the reaction of the springs against the plungers throws the drawer open.

10 is a rocking shaft provided with an arm 11, which projects in the path of the push-bolt 4, and an arm 12 similarly in the path of a branch 13 of the recording push-bolt 5. A spring 14 connects the arm 11 with the side of the case, so that when the shaft is rocked by either push-bolt it automatically returns to its normal position by reason of the tension of the spring as soon as the force applied to the push-bolt is removed. I have constructed the push-bolt 4 with a lateral bend 15, so that it will strike the upper end of the arm 11, and the guide-bearing 16 acts as a stop against the bent portion of the bolt to limit its outward or return movement. The end of the bolt is engaged by the arm 11 when in its upright or normal position, thus limiting the return movement of the shaft.

Figure 7:
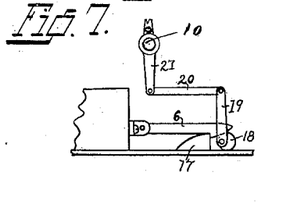
Fig. 7 is a detail view of the mechanism for disengaging the drawer-retaining hook.

17 is a lug or catch behind which the hook 6 is adapted to engage when the drawer is closed, as best shown in Fig. 7.

18 is an eccentric pivotally attached in the rear of the catch 17, underneath the beveled end of the hook 6, and connected to the shaft 10 by the arm 19, connecting-link 20, and arm 21 of the shaft, so that the rocking of the shaft causes the eccentric to oscillate and throw the hook out of engagement with the catch, thus releasing the drawer.

Figure 6:
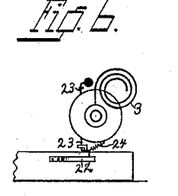
Fig. 6 is a detail view of the gong and gong-actuating lever.

One side of the drawer is provided with a rearward-extending gong-actuating clutch 22, adapted to engage with the oscillating two-armed gong-lever 23 when the drawer is closed, as best shown in Fig. 6.

24 is a spring connecting the gong-lever with the side of the case, and as the drawer is thrown open the lever is oscillated by the clutch till the tension of the spring 24 causes the lever to escape therefrom. Its recoil causes the lever to strike the gong, the sounding of the latter being thus seen to be simultaneous with the opening of the drawer.

Figure 4:
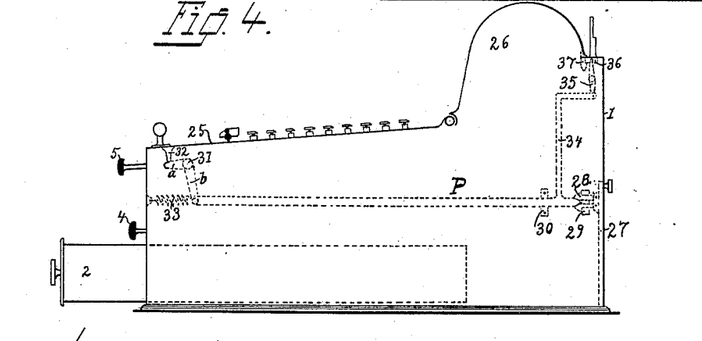
Fig. 4 is a side view of the same, with dotted lines indicating the position of the locking-rods.

The case of my register is provided with the inclined cover 25, hinged to the arched rear portion 26, as best shown in Fig. 4.

27 is a rear door provided with a door-retaining hook 28, adapted to be pressed into engagement with the catch 29 by the locking-rod P. This locking-rod is supported at the rear of the case by the guide-bearing 30 and at the front of the case by the pivoted two-armed lever 31, so arranged that the lug 32 on the cover 25 will bear upon the arm $a$ of the lever, thus throwing out the arm $b$, which supports the locking-rod, and forcing the latter into engagement with the hook 28. When the cover 25 is raised, the locking-rod P is withdrawn by the spring 33, releasing the door-retaining hook 28, and the door can then be opened.

I have also shown in Fig. 4 a device for locking the arched portion 26 of the cover in place. The branch rod 34 of the locking-rod P communicates its motion to the centrally-pivoted lever 35, which is adapted to actuate the key 36 and to engage and disengage it from the looped catch 37, carried by the arched portion of the cover 26. The object of this arrangement is to provide for automatically locking all other portions of the case by closing the inclined cover 25, the latter being itself secured by an ordinary spring-lock 38; but it is seen that by unlocking and raising this inclined cover 25 the arched cover 26 and door 27 are both also released, and all parts of the machine can then be easily reached.

Figures 1, 2, 3:
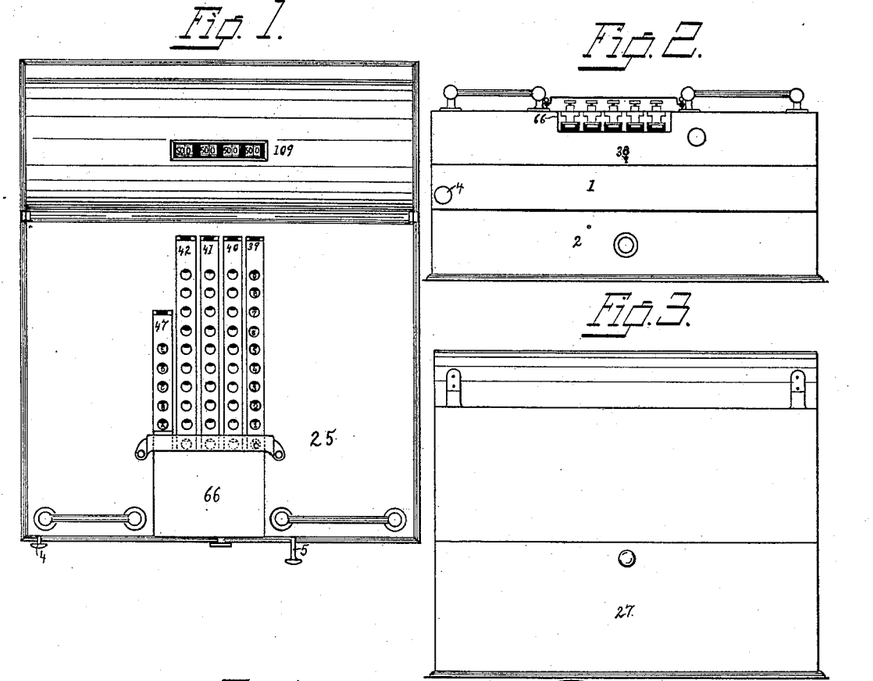
Figure 1 is a plan view of the case, showing the printing-plate and type-holding slides.
Fig. 2 is a front view of the same, showing the discharge-recess and the front ends of the type-slides.
Fig. 3 is a rear view of the case, showing the rear door.
Figures 8, 9, 10:
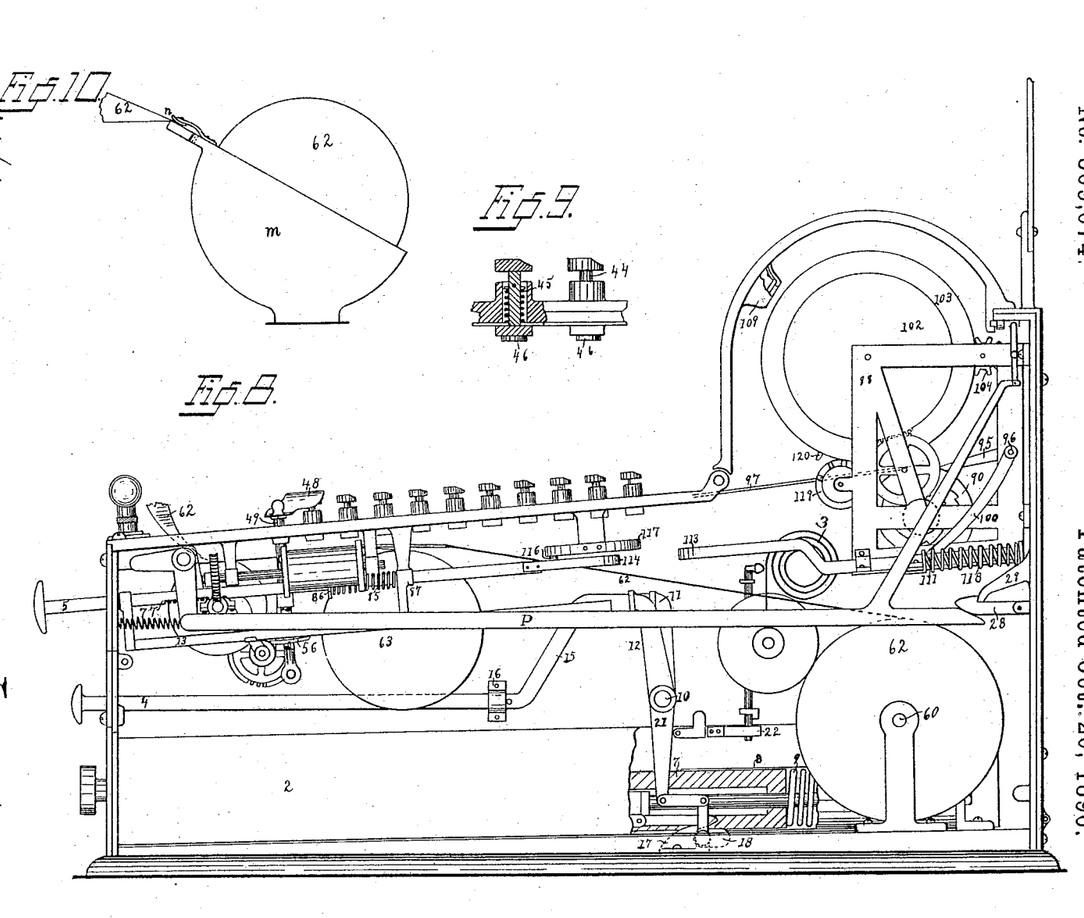
Fig. 8 is a right-hand side view with the side of the case removed to show the interior mechanism.
Fig. 9 is a detail view of a portion of one of the type-slides, showing the naught type and stem in section and the unit type entire.
Fig. 10 is a view of a modified form of support for the coupon record-strip.

The recording mechanism is attached to the cover 25, as best shown in Fig. 1. A series of type-slides 39, 40, 41, and 42 are movably supported by the cover in the slotted guide-bearings 43. 44 are vertically-movable type-stems adapted to project through the slides and supported by the helical springs 45, as shown in Fig. 9. On the under side of the slides these stems are provided with numeral types 46, and I have arranged ten of these stems in each slide, the first or lowest stem being provided with a naught or zero type-numeral, and the remaining stems having numerals ranging successively from "1" to "9," inclusive. The right-hand slide 39 represents the units-column, and the next slide 40 represents the tens-column, &c., the first two slides being therefore taken as representing fractional portions of a dollar. The types upon the third slide 41 are each provided with a decimal point on the right-hand side of the type-numeral, and the last slide 42 is provided with the character "$" on the left hand of each type-numeral, so that the total amount recorded at a given time will be indicated in dollars and cents. I have also shown a salesman's slide 47, similarly constructed and placed, but having character or letter types adapted to identify the several clerks or salesmen who operate the register.

Figure 11:
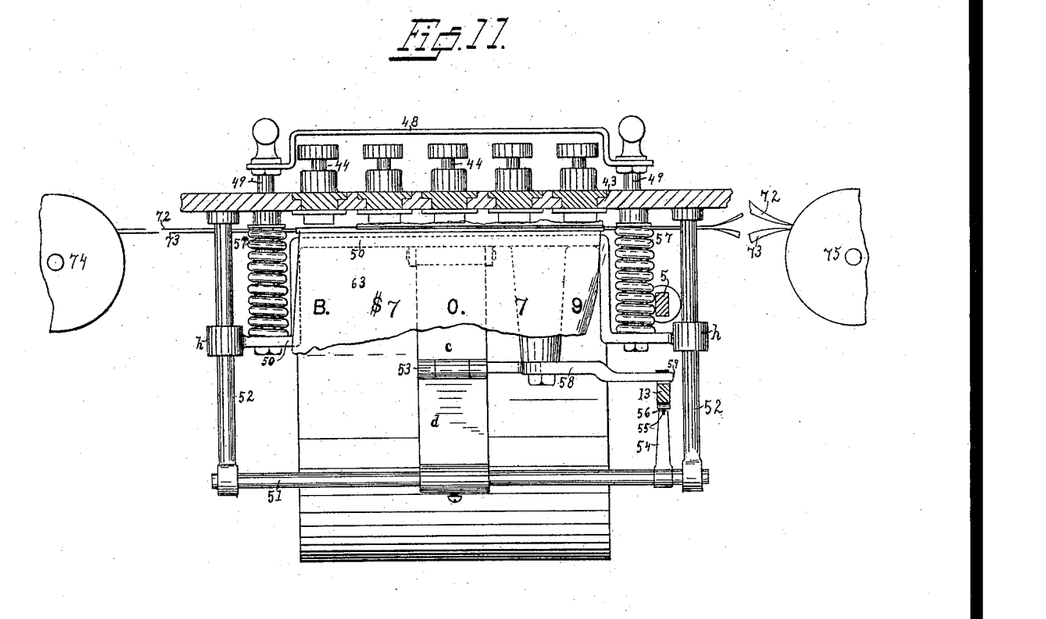
Fig. 11 is a detail front view of the actuating mechanism of the printing-plate, drawn on a vertical section in the plane of the front edge of the printing-plate.

The mechanism for actuating the type-stems and types in printing the record is best shown in Fig. 11. 48 is a printing-plate supported on the actuating-post 49 from a vertically-movable tie-plate 50 underneath the cover. The printing-plate is located above the lower or front end of the slides, preferably above the zero numeral types, when the slides are in their normal positions; but as each slide can be drawn forward in its guides each of its ten numeral types, as well as the character types of the salesman's slide, can be successively drawn underneath the printing-plate, and therefore with the four slides shown any number may be recorded from "0" to "9999."

For actuating the printing-plate to print the record I have provided a supporting tie-bolt 51 underneath the tie-plate 50, the latter being provided at each end with the guide-bearings $h$, adapted to slide vertically on the hang-bolts 52, which support the tie-bolt.

Between the tie-bolt 51 and tie-plate 50 I have provided a one-way hinged or toggle-jointed lever 53, the upper arm $c$ of which is pivoted to the tie-plate, while the lower arm $d$ is rigidly attached to the tie-bolt. When the arms of the hinge are in alinement, the tie-plate 50 is lifted and the printing-plate 48 is held above and away from contact with the type-stems 44, leaving the type slides and stems freely movable thereunder; but in making the record the toggle-joint is tripped or opened, that is, its arms are thrown out of alinement by the trip-lever 54, which is rigidly attached to the rocking tie-bolt 51 and is adapted to project into a notch 55 in the segment 56, located on the branch 13 of the push-bolt 3. The inward movement of the push-bolt actuates the trip-lever and rocks the tie-bolt, thus tripping the joint. The support of the joint-levers being thus removed from the tie-plate, the latter is thrown downward by a quick positive movement by the press-springs 57, located between the plate and the cover, and the printing-plate is thus drawn downward forcibly upon the type-stems to force the types upon the printing-ribbons, hereinafter described.

58 is an alining or joint-closing lever pivoted to the tie-plate, with one end projecting through a slot 59 in the branch rod 13 and the other end adapted to bear against the arms or hinge of the joint-lever 55 when the latter is in its open position. After opening the joint by the trip-lever, as above described, the continued movement of the push-rod 5 and branch 13 causes the lever 58 to be engaged in the end of the slot 59, and the opposite end of the lever is brought to bear forcibly against the joint, realining the arms $c$ and $d$ to lift the tie-plate in opposition to the springs 57 and elevate the printing-plate free from contact with the type-stems. The latter are raised individually to a less height by their respective springs 45, thus removing the types from contact with the printing-ribbons. The toggle-joint lever being thus placed as a support underneath the tie-plate, the trip-lever 54 is in position to again engage in the notch 55 when the push-rod returns to its normal position, thus leaving the parts in position for further service.

Figure 12:
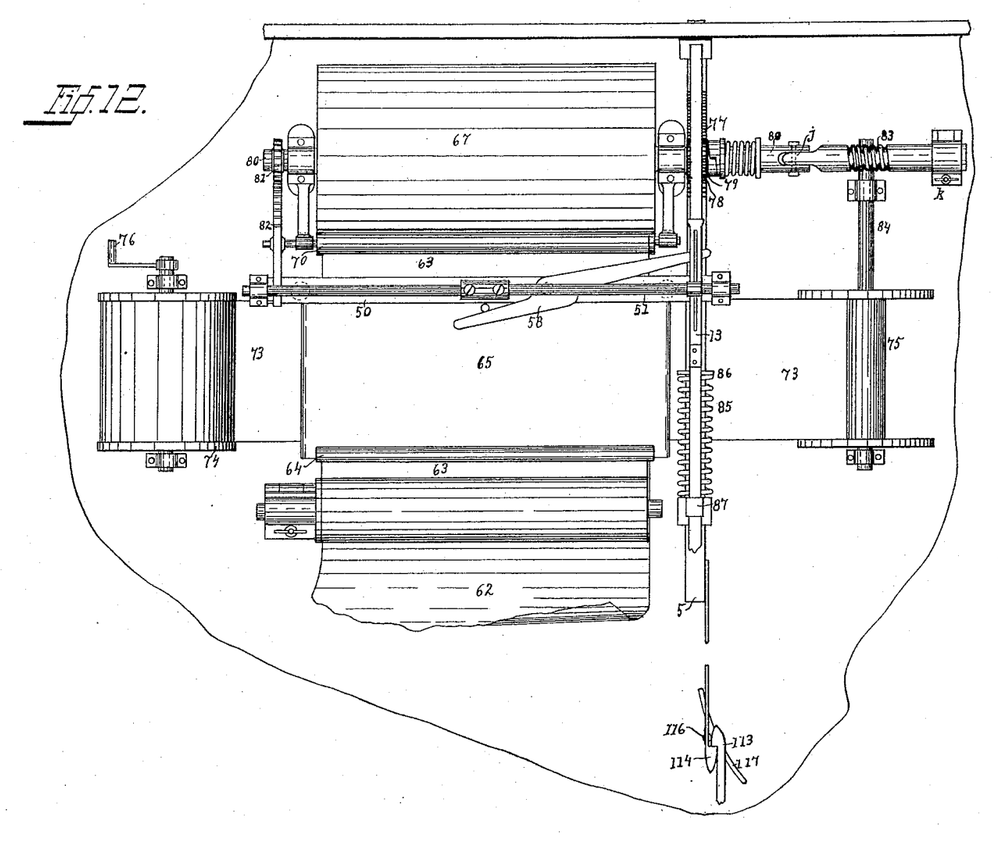
Fig. 12 is a view of the recording mechanism as shown from the under side when the cover is raised.
Figure 13:
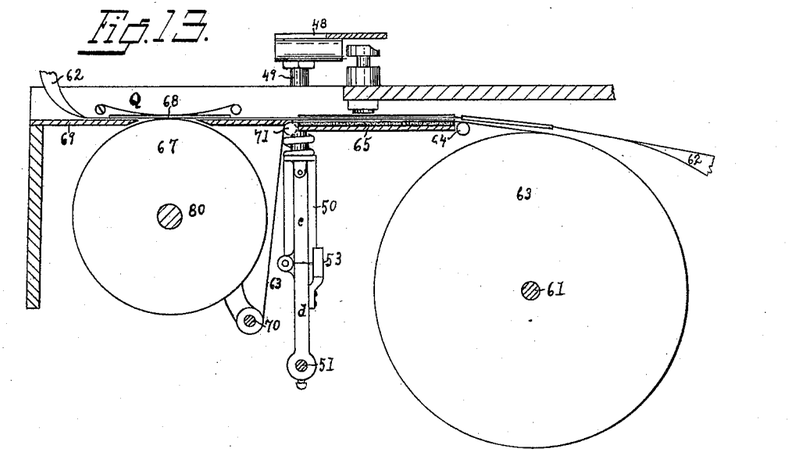
Fig. 13 is a view of the recording mechanism, drawn on a vertical section in the plane of the edge of the type-slide 41.
Figure 14:
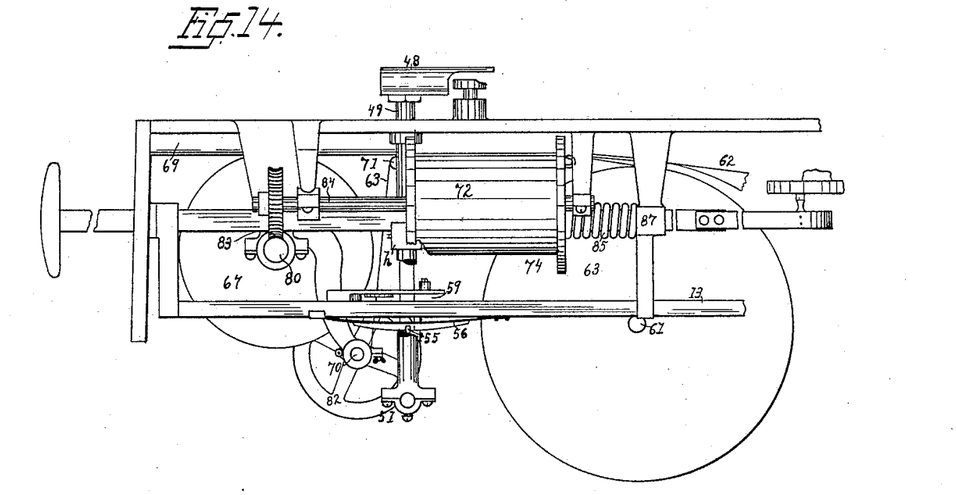
Fig. 14 is a right-hand side view of the recording mechanism.

The record is printed on strips of paper which are wound upon the supply-rollers 60 and 61 in the interior of the case, as best shown in Fig. 8. The strip 62 is a coupon-strip, that is, the strip is divided into separable coupon-sections by cross-perforations at regular intervals. This strip is wound upon the roller 60, or, if desired, it may be placed in a basket $m$ and fed therefrom through a spring-actuated friction-slot $n$, as shown in Fig. 10. The strip 63 is continuous and unperforated and is wound upon the supply-roller 61. Both are fed or drawn from their respective supply-rollers over the guide-roller 64 and bed-plate 65, the latter being located directly under the printing-plate 48 in the rear of its supporting-posts 49, as best shown in Figs. 12, 13, and 14. The cover 25 is provided with the recess 66, which extends from its front edge to the rear of the printing-plate, as shown in Fig. 11, and into which the coupons are adapted to be discharged after the record has been printed. The upper or coupon strip 62 is fed between the discharge-roller 67 and the bearing-plate 68, the latter being supported elastically by the spring Q, and the revolutions of the discharge-roller are adapted by its frictional contact to draw the coupon-strip from its supply basket or roller over the bed-plate and deliver it from under the bearing-plate upon the flat delivery-plate 69 at the bottom of the front portion of the recess 66.

70 is the actuating and storing roller of the lower or duplicate record-strip 63, the strip being drawn by it from the supply-roller 61 over the guide-roller 64, bed-plate 65, and guide-roller 71.

72 and 73 are ink-ribbons stretched transversely across the strips over the bed-plate 65 and under the printing-plate 48. The ribbon 72 passes above the strip 62 and the ribbon 73 above the strip 63, so that the impress of the types will be imparted from both ribbons upon the strip underneath them, respectively. At one end the ribbons are wound upon a supply-spool 74, and at the other ends they are connected with a winding-spool 75, which is actuated intermittently to draw the ribbons across the bed-plate and present a new surface for the type impressions. When the ribbon has so far passed to the winding-spool 75 that it is unwound from the spool 74, it is returned to the latter by means of a manually-operated crank 76 and is then ready for further service.

The connecting mechanism between the record push-bolt 5 and the actuating-rollers of the record-strips is best shown in Fig. 12, as viewed from the under side when the cover is raised.

77 is a rack located on the under side of the bolt 5 and adapted to engage with the gear-teeth 78 of the one-way clutch 79. The latter is located on the shaft 80 of the discharge-roller 67 and is adapted to engage with the shaft only during its reverse movement, caused by the return movement of the push-bolt. When the clutch thus engages with and actuates the shaft, the motion of the latter is communicated to the discharge-roller 67, thus drawing the coupon-strip from its supply-roller over the bed-plate, as above described, and discharging the printed coupon upon the delivery-plate 69. Motion is also communicated through the shaft 80 and the gear-wheels 81 and 82 to the storing-roller 70, thus winding the duplicate record-strip 63 upon it and drawing the printed portion of the strip from the bed-plate 65. The movement of the shaft is also communicated through the worm-gear 83 and spool-shaft 84 to the winding-spool 75, thus winding the ribbons upon it and drawing them from the spool 74, as above described. In rewinding the spool 74 by means of the crank 76, as above described, the jointed portion $j$ of the shaft 80 is released from its bearing $k$ and the worm-gearing 83 disengaged.

The return movement of the push-bolt 5 is automatic, being controlled by the reaction of the helical spring 85, located between the annular enlargement 86 of the push-bolt and the guide-bearing 87, through which said bolt passes. The inward movement of the bolt compresses the spring, and the latter recoils as soon as the pressure upon the bolt is removed to drive the bolt outward, as the clutch only engages the shaft during the outward movement of the bolt. It is thus seen that the feeding of the record-strip and ink-ribbons is automatic, and as the printing is done and the cash-drawer opened with the inward movement of the bolt the feeding of the strips follows automatically with its outward movement without further attention from the operator.

The mechanism for operating the indicating and registering rollers is best shown in Figs. 8, 15, 16, and 17.

88 is a supporting-frame in which the rollers and gearing are located.

89 is a spool-supporting shaft having a series of slide-actuated spools 90 located thereon and adapted to revolve independently of said shaft.

Figure 15:
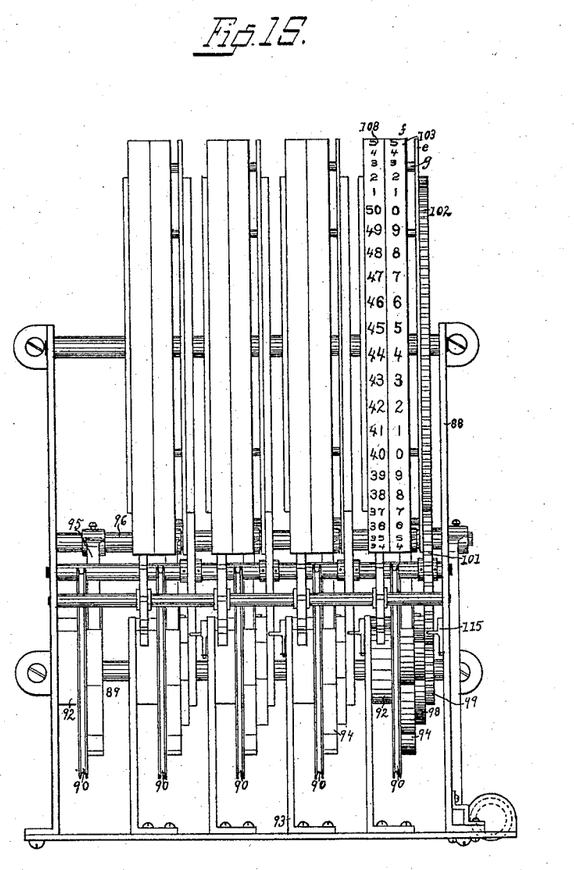
Fig. 15 is a front view of the registering and adding rollers and the mechanism for actuating the same.
Figure 16:
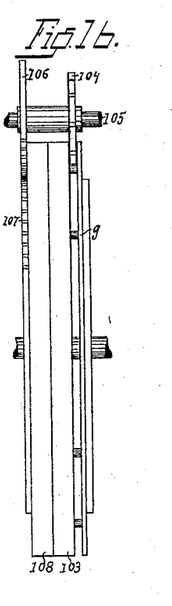
Fig. 16 is a detail top view of one of the rollers, showing the gear-wheels.

92 is a winding-spring connected to each of said spools, with one end attached to a spring-retaining post projecting upward from the lower part of the frame, as best shown in Fig. 15, and 94 is a spool-retaining ratchet-wheel rigidly attached on the side of the spool having teeth corresponding in number to the number of types on the slide and adapted to be engaged by the pawl 95, supported on the rocking pawl-shaft 96 in the rear of the spools.

97 is a cord or chain, preferably of wire, wound upon the spools and attached to the rear end of the type-slides.

At the side of each spool I have located a gear-actuating ratchet-wheel 98, rigidly attached to the gear-wheel 99 and revolubly supported upon the shaft 89, the spools being provided with dogs 100, adapted to engage with the teeth of the gear-ratchet 98 to actuate the gear-wheels in one direction only. It is thus seen that as one of the type-slides is drawn out its motion is communicated to its respective cord 97 and spool 90, thus winding up the spring 92 preparatory to the automatic rewinding of the spool and withdrawal of the slide to its normal position. The motion of the spool is also communicated by means of the dog 100, through the gear-ratchet 98, gear-wheels 99, 101, and 102, to the adding-roller 103, and the spool is then held against the reaction of the spring 92 by the pawl 95, which engages with the spool-retaining ratchet-wheel 94 until released by the rocking of the pawl-shaft 96, as hereinafter described.

The adding-roller 103 consists of two circular disks $e$ and $f$, separated by connecting-pins $g$. The disk $f$ is provided with indicating-numbers on its periphery, ranging from "0" to "9," respectively, in each space between the pins $g$, and the gearing is so arranged that this disk will be moved a distance equal to the space between the numbers when the slide has moved a distance equal to the space between the types. It is thus seen that when the types on a given slide have recorded numbers the sum of which is equal to the number ten (10) the periphery of the disk will have moved to a distance equal to the space between the pins. The pins are adapted to engage with the teeth of the drum-actuating gear-wheel 104, moving the latter one cog while passing, and the motion of this wheel is communicated through its supporting-shaft 105 and the connecting gear-wheels 106 and 107 to the registering-drum 108. The drum 108 is provided with numbers ranging from "0" upward, corresponding in number to the number of teeth on the gear-wheel 107, and is thus adapted to indicate the number of teeth on the actuating-wheel which have been engaged by the pins. Considering these numbers as occupying the tens-column and those on the adjacent indicator-disk as occupying the units-column, the reading of the drum and disk is thus seen to represent the total sum of the numbers registered by the type-slide to which it is connected. A slot 109 in the arched portion 26 of the cover exposes this "reading" to the exterior of the case.

It will be observed that each of the numeral type-slides is thus connected with an indicator disk and drum, as shown in Fig. 15, and that as the slides are arranged to represent units, tens, hundreds, &c., that therefore the numbers shown by each disk and drum in the reading are to be taken as representing an equal number of units, tens, hundreds, &c., recorded by the types of its connected slide, and in computing the total amount recorded by all of the slides it is necessary to add up the readings of the several rollers, the sums being placed in the column with the right-hand figure in each case occupying the units, tens, or hundreds place, according to the position of the rollers with respect to their connected slide, from which each reading is taken.

Referring to Fig. 1, and assuming that each set of rollers indicates the number "500" as having been recorded by the slide to which it is connected, the several readings are noted as follows, commencing with the right-hand roller:

500
500
500
500 and it is thus seen that the sum of the readings so placed indicates the total sums recorded by all the slides, which is in this case "555500" or "$5,555.00" if the amount is computed in dollars and cents. The object of this arrangement, by which each spool is provided with separate registering mechanism, is to permit the several slides to be drawn out simultaneously without interfering with the registration of either.

It will be observed that the salesman's slide is merely connected with its respective rewinding-spool 90, as the record is sufficient for the purpose.

Figures 17, 18:
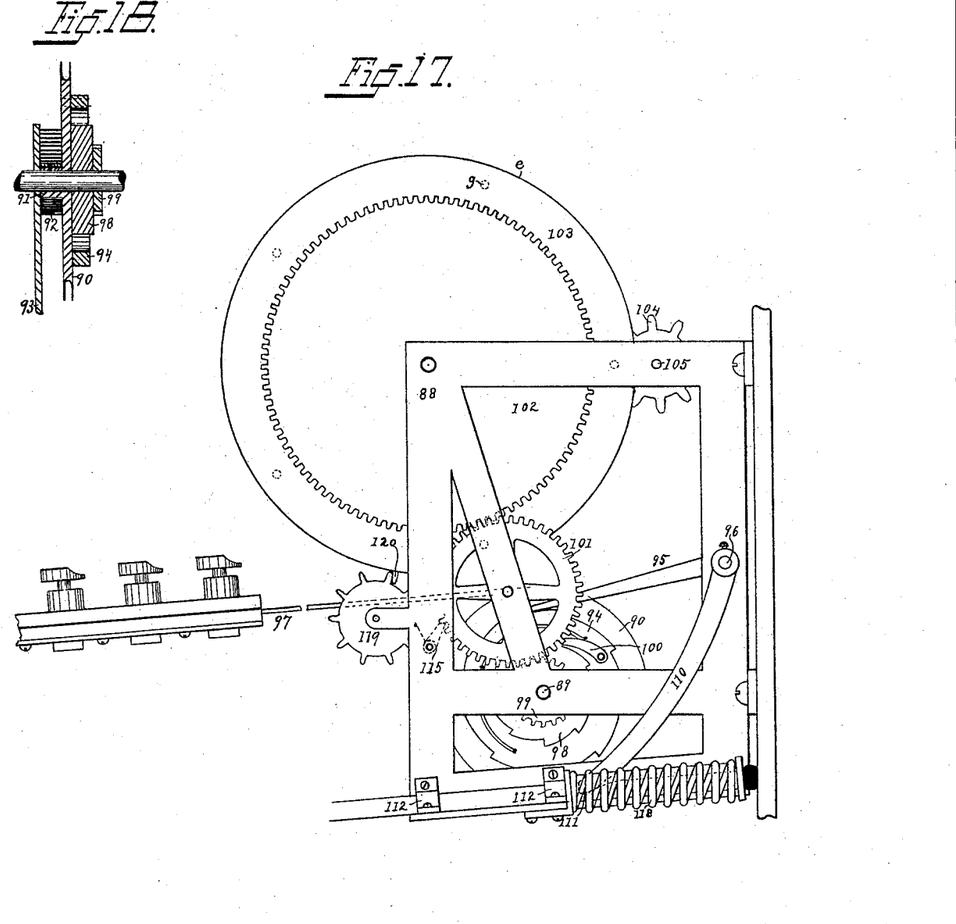
Fig. 17 is a right-hand side view of the adding-rollers and gearing, showing also the pawl-releasing shoe, adapted to permit the rewinding of the spools and the withdrawal of the type-slides.
Fig. 18 is a detail section view of one of the winding-spools.

The mechanism for automatically withdrawing the type-slides is best shown in Fig. 17.

110 is an arm attached to the pawl-shaft 96 and adapted to engage with a shoe 111. The latter is adapted to slide in the guideway 112 and is provided with a clutch-hook 113, adapted to engage with a similar hook 114 on the rear end of the push-bolt 5, as best shown from the upper side in Fig. 12. The clutch 113 is engaged by the hook 114 when the latter has nearly completed its outward movement, and by the reverse movement of the push-bolt 5 the shoe 111 is drawn forward, thus causing the arm 110 to rock the pawl-shaft 96 and release the pawls from engagement with the spool-retaining ratchet-wheels 94. As soon as the ratchets are released the recoil of the springs 92 causes the spools to rewind the cords 97 and withdraw the slides to their normal position, as above described.

115 is a dog located on the frame 88 and adapted to engage with the teeth of the gear-wheel 101 to prevent the friction of the rewinding-spools from actuating the gearing of the indicating-rollers.

The clutch-hook 113 and the push-bolt hook 114 are separated by the pin 116, attached to the latter and adapted to engage with a wedge-shaped guide 117 to throw the hook 114 laterally out of engagement with the clutch 113, thus releasing the shoe. The latter is withdrawn automatically by the shoe-actuating spring 118, thus rocking the pawl-shaft to engage the pawls with the spool-ratchets 94.

Where the sales during the day are likely to cause the drum 108 to perform more than one revolution, it may be found desirable to use a supplementary wheel 119, adapted to be actuated by the actuating-cog 120 of the registering-drum once during each revolution. The cogs of the wheel 120 being numbered it is thus adapted to indicate the number of revolutions of the drum.

In order to clearly indicate the operation of my invention, I will assume that a salesman who is identified by the character "B," reference being made to Fig. 11, desires to register the sum of seventy dollars and seventy-nine cents. He will first draw out the salesman's slide until the type-letter "B" is drawn underneath the printing-plate. The numeral type-slides 39, 40, and 42 will then be drawn out till the type-numbers of the slide 39, "7" of the slide 40, and "7" of the slide 42 are respectively underneath the printing-plate, the zero type of the slide 41 being normally in that position, as above described. As each numeral type-slide is drawn out its motion is communicated through its respective spool 89 and intermediate gearing to the corresponding adding-roller, changing the reading of the rollers correspondingly. The types being in position, the push-bolt 5 is driven inward, its motion being communicated through the branch 13 to the trip-lever 54, which trips or opens the toggle-jointed lever 53 and permits the printing-plate 48 to be drawn forcibly down upon the ink-ribbons, thus printing the record. The continued movement of the branch 13 of the push-bolt 5 actuates the joint-closing lever 58 and elevates the printing-plate to its normal position, the types being lifted independently by their spring-actuated stems. The branch rod 13 then strikes against the actuating-arm 12, which rocks the shaft 10 to release the drawer, and the latter in opening actuates the gong-lever and causes the alarm to be simultaneously given. At the same time the hook 114 of the push-bolt 5 engages with the clutch 113 of the shoe 111, and as the force applied by the operator is then removed the bolt is automatically thrown outward, its motion being communicated to the shoe, pawl-shaft arm, and pawl-shaft, thus disengaging the pawls 95 and permitting the type-slides to be withdrawn by the spring-actuated spools 90. The return movement of the bolt 5 is also communicated through the clutch 79 to the discharge-roller 67, thus discharging the printed coupon-strip into the recess 66 on the delivery-plate 69 and drawing a blank coupon upon the bed-plate. The discharged or printed coupon can then be torn off by the operator. The motion of the clutch 79 is also communicated to the storing-roller 70, winding the duplicate record-strip upon it and removing the printed portion from the bed-plate. At the same time the ribbon-winding spool 75 is actuated to remove the type-impressed portion of the ribbon from the bed-plate and the pawl-actuating shoe 111 is released from the hook 114, thus permitting the pawls to disengage with their respective spool-ratchets. The parts are thus restored to their original positions and are ready for further service.

Having thus described my invention, what I claim as new, and desire to secure by Letters Patent, is—

1. A cash-register consisting in the combination of an inclosing case provided with a cash-drawer, and an automatic lock therefor, a series of type-holding slides, movably located in guideways on said case, a numerically-graduated series of movable spring-supported types located in said slides, a bed-plate located below the path of the slides and types, one or more ink-ribbons stretched across said bed-plate, means for supporting one or more record-strips in the rear of said bed-plate, and a discharge-roller adapted to draw one of the said strips over said bed-plate and to discharge the same over said roller to the exterior of the case, together with means for forcing one of said types from each slide into contact with the ink-ribbons, and an actuating push-bolt adapted to release the lock of the cash-drawer and to actuate said discharge-roller, substantially as described.

2. A cash-register consisting in the combination of an inclosing case provided with a cash-drawer and an automatic lock therefor, a series of type-holding slides movably located in guideways on said case, a series of movable spring-actuated types supported from said slides, a bed-plate located below the path of the slides and types, one or more ink-ribbons stretched across said bed-plate, and means for supporting duplicate record-strips in the rear thereof, a friction-plate and a discharge-roller adapted to draw one of said strips over said bed-plate and to discharge the same over said roller by frictional contact with said plate, a record-storing roller, adapted to draw the other of said strips over said bed-plate and to wind it upon said roller, and means for forcing said types into contact with one of said ribbons, and an actuating push-bolt, adapted to actuate the record and discharge rollers, and to release the lock of said drawer, substantially as described.

3. A cash-register consisting in the combination of an inclosing case provided with a cash-drawer and an automatic lock therefor, a series of type-holding slides mounted movably on said case, a numerically-graduated series of spring-actuated type supported from said slides and a bed-plate located below the path thereof, one or more ink-ribbons stretched across the bed-plate, means for supporting a supply of record-strips in the rear of the bed-plate, a discharge-roller adapted to draw one of said record-strips over said bed-plate, and a friction-plate against which said discharge-roller is adapted to press to facilitate the discharge of the record-strip, together with a printing-plate for forcing one or more of said types into contact with the upper ink-ribbon, and an actuating push-bolt, adapted to release the lock of the cash-drawer and to actuate said printing-plate and discharge-roller, substantially as described.

4. A cash-register consisting of the combination of an inclosing case, provided with a cash-drawer and lock therefor, a series of type-holding slides mounted movably on said case, a numerically-graduated series of types movably supported by said slides, a bed-plate located below the path thereof, one or more ink-ribbons stretched across said bed-plate and wound over spools at each side thereof, means for passing record-strips over said bed-plate and under said ink-ribbons, and a printing-plate for forcing one or more of said types with the upper ink-ribbon, together with an actuating push-bolt adapted to release said drawer and to actuate said printing-plate with its inward movement and to rotate said spools with its outward movement, substantially as described.

5. A cash-register consisting of the combination of an inclosing case provided with a cash-drawer, a series of type-holding slides movably supported in slotted guide-bearings by said case, a series of movable spring-actuated types supported from said slides, a bed-plate located below the path of said slides, one or more supply spools or rollers adapted to support paper record-strips thereon, one or more actuating-rollers adapted to draw said strips from the supply-rollers over said bed-plate, one or more ink-ribbons stretched transversely of said strip or strips over said bed-plate, and a vertically-movable printing-plate supported over said bed-plate and above the type-slides and types, together with a push-bolt adapted to release said drawer and communicate motion to the printing-plate with its inward movement, and to the actuating-rollers of the record-strips with its outward movement, substantially as described.

6. A cash-register consisting in the combination of an inclosing case having a cash-drawer, a series of type-slides movably supported in guide-bearings by said case, a series of vertically-movable types supported by said slides, a bed-plate located below the path of said type-slides, means for passing one or more record-strips over said bed-plate, a spring-actuated, vertically-movable printing-plate, a toggle-jointed lever, adapted to support said printing-plate against the tension of its actuating-springs, and a lever for tripping said toggle-joint, together with a push-bolt adapted to actuate said trip-lever and release the cash-drawer, substantially as described.

7. A cash-register consisting of the combination of an inclosing case having a cash-drawer provided with an automatically-locking hook, a series of type-slides movably supported in guide-bearings by said case, a series of numerically-graduated types supported in said slides by spring-actuated stems, a bed-plate located below the path of said type-slides, means for passing record-strips over said bed-plates, a spring-actuated vertically-movable tie-plate, located in the interior of said case, a toggle-jointed lever located beneath said tie-plate and having arms adapted to be forced into alinement to elevate the tie-plate against the tension of its actuating-springs, a printing-plate supported from said tie-plate above said bed-plate and above the type-slides, and types, and a lever for tripping said toggle-joint, together with a push-bolt adapted to actuate said trip-lever and to release the locking-hook of said drawer, substantially as described.

8. A cash-register consisting of the combination of an inclosing case having a cash-drawer provided with an automatically-locking hook, a series of type-slides movably supported in guide-bearings by said case, a series of numerically-graduated types movably supported by said slides, a bed-plate located below the path of said type-slides, a spring-actuated vertically-movable tie-plate located in the interior of said case, a toggle-jointed lever located beneath said tie-plate and having arms adapted to be forced into alinement to elevate the tie-plate against the tension of its actuating-springs a printing-plate supported from said tie-plate above said bed-plate and above the type-slides and types, a lever for tripping said toggle-joint, together with a pivotally-supported lever for realining the arms of said toggle-joint, and a push-bolt adapted to actuate said trip-lever, to engage and actuate the joint-closing lever, and to release the locking-hook of said drawer, substantially as described.

9. A cash-register consisting of the combination of an inclosing case, having a cash-drawer and an automatic lock therefor, a series of type-slides movably supported by said case a numerically-graduated series of movable numeral types supported by certain of said slides, and a series of movable character types supported by other of said slides, a bed-plate located below the path of said slides, and one or more ink-ribbons stretched across said bed-plate, a printing-plate adapted to force one or more of the types into contact with said ink-ribbons, together with one or more rollers adapted to feed the record-strips over the bed-plate, and a push-bolt adapted to actuate said printing-plate and to release said drawer with its inward movement, and to communicate motion to said rollers during its outward or reverse movement, substantially as described.

10. A cash-register consisting of the combination of an inclosing case provided with a cash-drawer, one or more type-slides movably supported in slotted guides by said case, a series of vertically-movable spring-actuated types supported by slide or slides, and a bed-plate located under the path thereof, a revoluble winding-spool located in the rear of each slide, and an actuating-cord connecting it therewith, an adding-roller adapted to be actuated by the forward revolution of said winding-spool, a gear-wheel adapted to be periodically actuated by said roller, and a registering-drum connected by suitable gearing with said periodically-actuated gear-wheel, together with a manually-operated push-bolt for actuating the types in said type-slides, and opening the cash-drawer in connection therewith, substantially as described.

11. A cash-register consisting of the combination of an inclosing case provided with a cash-drawer, one or more slides movably supported in slotted guides by said case, a series of vertically-movable spring-actuated types supported by said slides, a series of interacting gear-wheels, and a revoluble registering-drum connected with said type-slides and adapted to be actuated thereby, together with a printing-plate for actuating said types individually, to print one or more record-strips, and a push-bolt for actuating said printing-plate and opening the cash-drawer, substantially as described.

12. A cash-register consisting of the combination of an inclosing case having a cash-drawer, a series of movable type-slides supported by said case, a series of vertically-movable spring-actuated types supported by said slides, a series of winding-spools revolubly supported in the rear of said slides, cords or chains wound upon said spools and connected with said slides, slide-withdrawing springs adapted to be wound up by the forward revolutions of said spools, means for temporarily holding said spools against the tension of said springs, gearing adapted to communicate the motion of said spools to revolving registering-drums, and an arched portion of said case adapted to cover said drum, provided with a slot adapted to expose the registering-numerals thereon successively with the revolutions of said drum, together with an actuating push-bolt and suitable mechanism for communicating the motion thereof to said types independently, said bolt being also adapted to release said cash-drawer and winding-spools, substantially as described.

13. In a cash-register, substantially as described, the combination with the actuating push-bolt, of the rocking shaft 10, the hook-engaging catch 17 rigidly located in the bottom of the case, and the eccentric pivotally supported in the rear of said catch, together with the connections between said shaft and said eccentric adapted to communicate the motion of said shaft to the eccentric and to oscillate the latter, substantially as described.

14. A cash-register, consisting in the combination of an inclosing case provided with a cash-drawer, one or more type-slides movably supported in slotted guides by said case, a series of vertically-movable types supported by said slide or slides, and a bed-plate located below the path thereof, one or more revoluble registering-drums located in the rear of said type-slides, and connections between said slides and registering-drums, adapted to communicate the motion of the former to the latter together with means for simultaneously actuating said types and releasing said drawer, substantially as described.

15. In a cash-register, substantially as described, the combination of the inclosing case having a door in the rear thereof, and a hinged cover therefor, a locking-hook attached to said rear door adapted to engage with a catch attached to the case, a rod adapted to force said locking-hook into engagement with the catch, a pivotally-supported two-armed lever connected to said rod and a lug attached to the cover adapted to actuate the rod and force the same into engagement with the door-locking hook, substantially as described.

16. In a cash-register, the combination of the inclosing case, the front and rear covers and the rear door therefor, the door-locking rod adapted to be actuated by the front cover and the reciprocating key adapted to engage with a catch on the rear cover, together with the key-actuating mechanism, connecting said locking-rod with said key, substantially as described.

17. In a cash-register, the combination of a printing-plate supported by vertically-movable rods, a tie-plate connecting the lower ends of said rods, and one or more springs adapted to depress the tie-plate, together with means for supporting said tie-plate in opposition to said springs, and a drawer-releasing push-bolt for temporarily removing such support, substantially as described.

18. In a cash-register, the combination of a spring-actuated printing-plate, a toggle-jointed lever adapted to support said printing-plate in opposition to its actuating-springs, and a trip-lever adapted to force the arms of said toggle-joint out of alinement to remove the support from said printing-plate, substantially as described.

19. In a cash-register, the combination of a toggle-jointed lever adapted to support a printing-plate in opposition to one or more plate-actuating springs, a trip-lever for forcing the arms of said toggle-joint out of alinement with each other, and removing the support from said printing-plate, and a joint closing or realining lever adapted to force said arms into realinement, together with an actuating push-bolt adapted to successively actuate said trip-lever and said joint closing or realining lever, substantially as described.

20. In a cash-register, the combination of a revolving shaft and discharge-roller located thereon, a one-way clutch adapted to communicate motion from a reciprocating push-rod to said shaft, a record-roller, and a ribbon-winding spool, each independently connected with said shaft by suitable gearing, substantially as described.

21. In a cash-register, the combination with a drawer-releasing push-bolt provided with a clutch on its rear end, of one or more spring-actuated winding-spools provided with pawl-engaging ratchets, a shaft located in the rear of said spool or spools provided with one or more ratchet-engaging pawls, and an arm attached to said shaft adapted to be engaged by said clutch, to rock the shaft and engage and disengage said pawls from their respective ratchet-wheels, substantially as described.

In testimony whereof I affix my signature in the presence of two witnesses.

JOSEPH F. SCHEUER.

Witnesses:
LYMAN G. WHEELER,
HENRY L. GRIEB.